United States Patent [19]

Tanaka et al.

[11] Patent Number: 5,062,047
[45] Date of Patent: Oct. 29, 1991

[54] TRANSLATION METHOD AND APPARATUS USING OPTICAL CHARACTER READER

[75] Inventors: Hideaki Tanaka, Daito; Toshiaki Morita, Nara; Yoshihiro Kitamura, Osaka; Yasuhisa Nakamura, Joyo, all of Japan

[73] Assignee: Sharp Kabushiki Kaisha, Osaka, Japan

[21] Appl. No.: 344,397

[22] Filed: Apr. 28, 1989

[30] Foreign Application Priority Data

Apr. 30, 1988 [JP] Japan .................. 63-108229

[51] Int. Cl.⁵ ............................................. G06F 15/38
[52] U.S. Cl. .................................................. 364/419
[58] Field of Search ................. 364/419, 900 MS File

[56] References Cited

U.S. PATENT DOCUMENTS 4,393,460 7/1983 Masuzawa et al. ................. 364/900
4,890,230 12/1989 Tanoshima et al. ................ 364/419

FOREIGN PATENT DOCUMENTS 0144976 8/1983 Japan ................... 364/419
0020285 2/1985 Japan ................... 364/419
0100263 6/1985 Japan ................... 364/419
0224859 10/1987 Japan .
2131582 6/1984 United Kingdom ....... 364/419

Primary Examiner—Jerry Smith
Assistant Examiner—David Huntley

[57] ABSTRACT

A translation apparatus includes a translating device connected to an optical character reader for input. The optical character reader includes a reference dictionary stored in a first memory which stores a plurality of reference character strings of morphemes in a first language, each morpheme being identified by a unique address. A morpheme analysis device in the optical character reader matches an optically read character string with one of the morpheme stored in the first memory. A communication device transfers the results of the morpheme analysis, including morphemes and their associated addresses, to the translating device. At the translating device, the results from the morpheme analysis are used to translate the optically read character string to a second language by accessing a second memory. The second memory is addressed identically to that of the first memory.

2 Claims, 4 Drawing Sheets

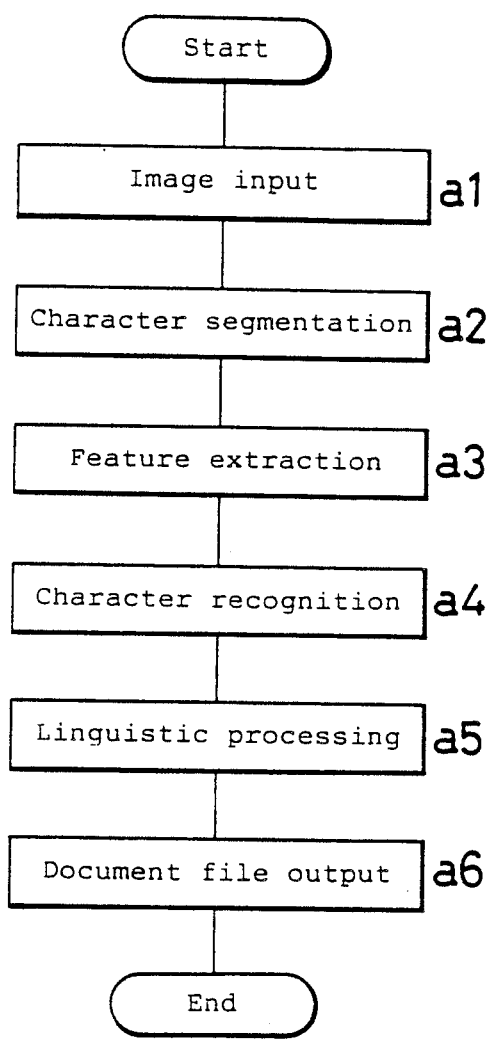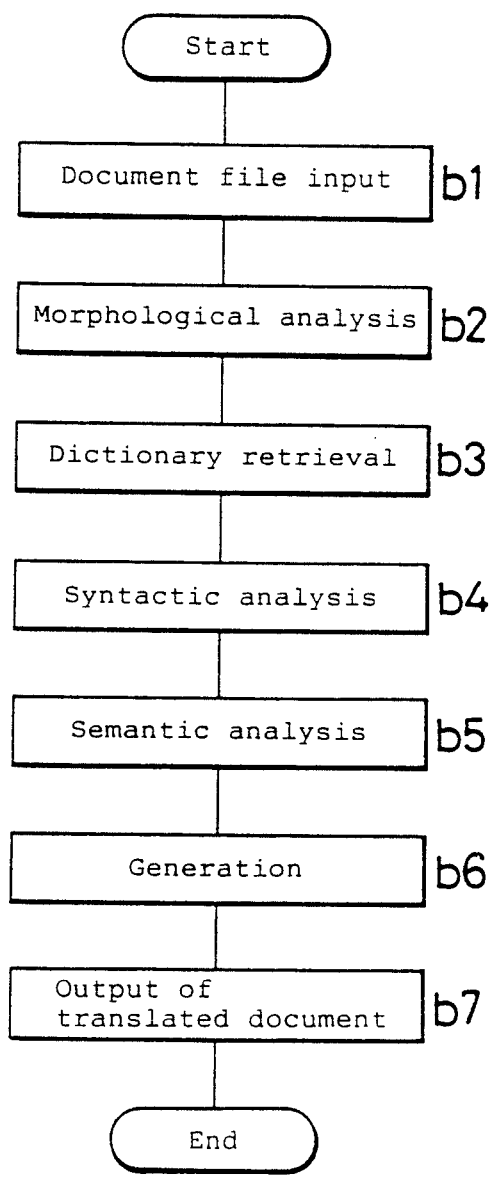

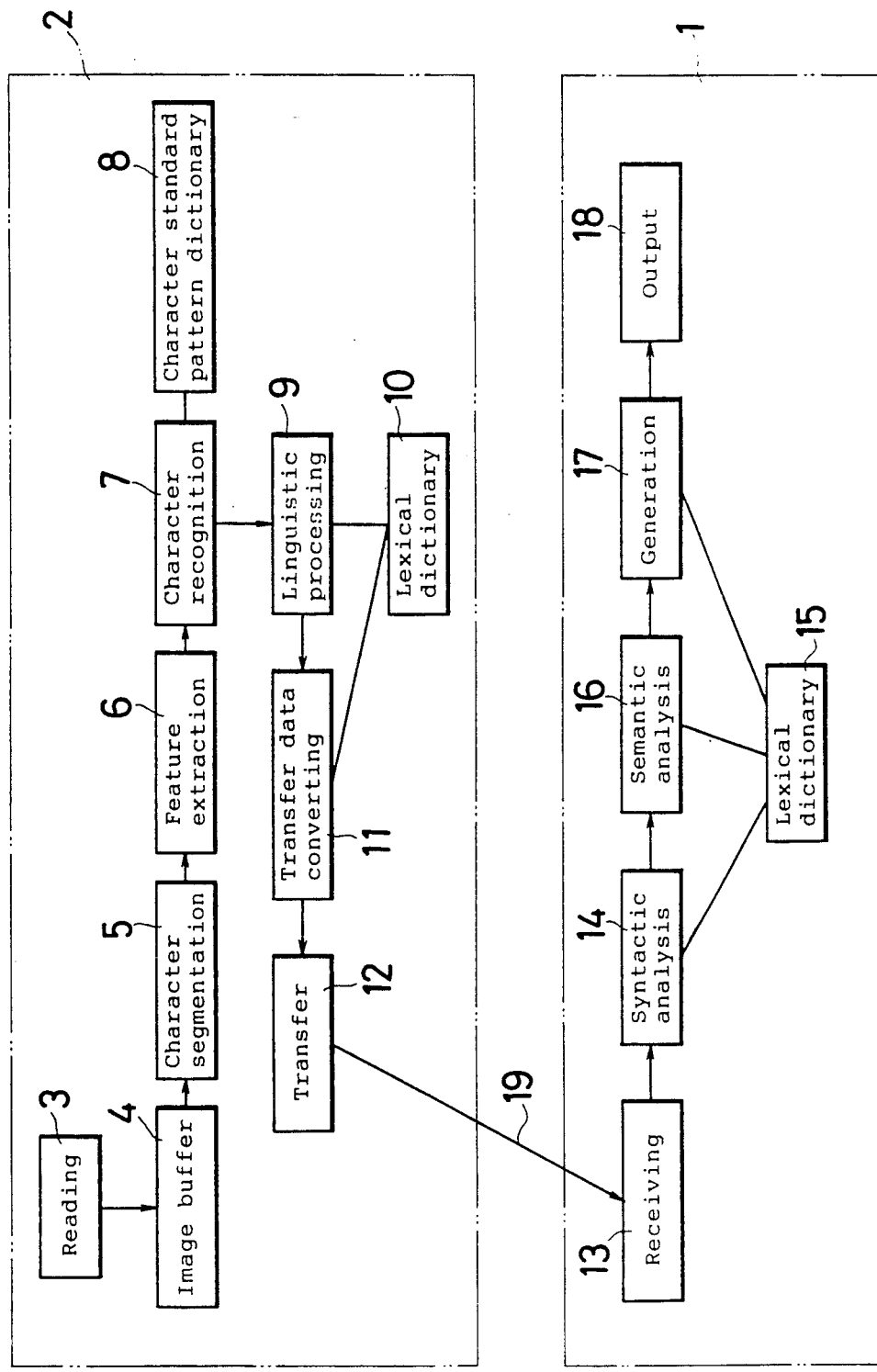

TRANSLATION METHOD AND APPARATUS USING OPTICAL CHARACTER READER

BACKGROUND OF THE INVENTION

1. Field of the Invention

The present invention relates to a translation method and translation apparatus for reading a document described in a certain language by means of an optical character reader (OCR), and translating it into other language.

The term "morpheme" used in this specification refers to a certain unit composed of a series of plural characters or sounds in one language, forming at least one meaningful word.

2. Description of the Prior Art

The optical character reader (OCR) for reading optically an original document printed in types or the like, recognizing characters from the read image of original, and delivering information such as character codes has been conventionally employed. The output of the OCR is, for example, fed into a computer, and is subjected to various processing, and displayed and delivered to display devices. At the same time, an OCR may be also used for inputting data into a translation apparatus for translating a certain language into other languages.

FIG. 1 shows a character recognition processing procedure in an OCR, and FIG. 2 shows a translation processing procedure in a translation apparatus using a OCR as the input means. In FIG. 1, the OCR first, at step a1, stores the image data of the original image into a memory called an internal image buffer. At next step a2, the image data stored in the internal image buffer is segmented into character units during the character segmentation processing.

At step a3, features are extracted from the segmented characters. The feature data includes, for example, the number of black pixels for composing the segmented character.

The original image at step a1 is read by using a means for reading including a charge-coupled device (CCD). The original image is then binary-coded corresponding to the white pixels and black pixels in each of the plural pixels of the reading means. Binary data is stored into the internal image buffer as the image data. Therefore, the number of black pixels mentioned above refers to the number of black pixels, for example, when a rectangular region on the original plane allotted for one character is divided into predetermined unit divisions.

The feature data extracted at step a3 is compared with reference information stored in a memory device called a standard character pattern dictionary provided in the OCR for storing feature data of plural characters. Character recognition processing called matching is executed at step a4. Characters segmented in this way are recognized as the feature data of a reference character stored in the standard character pattern dictionary.

At step a5, each group of plural characters recognized by the character recognition processing step is compared with the memory contents of a lexical dictionary provided in the OCR for storing plural words or the likes. The characters considered to be misrecognized in the processing step a4 are corrected. This process is referred to as linguistic processing. In this way, the recognition rate by the OCR is enhanced.

Afterwards, at step a6, a document file obtained by converting the recognized characters individually into character codes is delivered.

Referring to FIG. 2, the document file delivered from the OCR in the preceding procedure is fed into a translation apparatus at step b1.

The translation apparatus, at step b2, recognizes each group of plural continuous character codes as one word, and classifies them by the parts of speech, on the basis of the character codes composing the input document file.

At step b3, referring to the lexical dictionary provided in the translation apparatus, the meaning of the recognized word is extracted.

At step b4, syntactic analysis is effected by analyzing the modifying/modified relationship between composing a sentence. This process is conducted on the basis of the parts of speech of words obtained at step b2.

At step b5, from the plural meanings corresponding to each word obtained at step b3, an adequate meaning is selected corresponding to syntactic analysis. This process is called semantic analysis processing.

At step b6, translated words of one sentence are generated, and a translated document in characters or the like corresponding to the generated translated words is delivered at step b7.

In the OCR, in order to enhance the recognition rate, as mentioned above, the system includes a lexical dictionary, and a morphological analysis (linguistic processing) that is also performed in the translation apparatus. However, since the document file delivered from the OCR is a continuous string of character codes divided into character units, the translation apparatus can only complete translation processing after performing the same morphological analysis again. That is, the same morphological analysis is duplicated during character recognition and translation. Thus, the translation apparatus is wasting time by repeating the morphological analysis once executed in the OCR.

SUMMARY OF THE INVENTION

It is hence a primary object of the invention to present a method and apparatus for translation having a simplified translation process in a translation apparatus with simplified data transfer.

To achieve the above object, the invention presents a method for electronically translating an optically reading textual data comprising:

a first step of morphologically analyzing a first language, and detecting a first address from a first memory storing the first address corresponding to each morpheme;

a second step of transferring the first address;

a third step of reading out a morpheme of a second language from a second memory storing morphemes of the second language, corresponding to the transferred first address; and a fourth step of generating a sentence in the second language on the basis of the morphemes of the second language read out from the second memory.

The method for translating according to a preferred embodiment of the invention, includes at the first step, a part for speech of each morpheme of the first language is detected, at the second step, data for expressing the part of speech is transferred, and at the third step, the morpheme of the second language is read out from the second memory on the basis of the transferred address and the part of speech.

The invention presents a method for translating comprising the steps of:

optically reading a character string of a first language by an optical character reader;

comparing the read character string with the contents of a first memory for storing plural character strings of the first language;

recognizing a meaningful word from the read character string;

translating the character string into a second language using a processing device possessing a second memory having the memory contents of the first memory and information relating to it, and the second memory being provided with the identical address to the first memory as for the common character string; and transferring information relating to the type of the recognized word of the first language and the common address information from the optical character reader to the processing device.

The invention also includes an apparatus for translating comprising:

means for decomposing a first language into morphemes;

a first memory for storing a first address corresponding to a morpheme of the first language;

means responsive to an output from the decomposing means for reading out the first address of the first memory and for transferring it;

a second memory having a store region possessing a second address corresponding to the first address of the morphemes of the first language for storing a morpheme of a second language translated from the morphemes of the first language in the store region;

means responsive to an output of the reading and transferring means for reading out data of the second language stored in the store region of the second memory; and means responsive to the data read out by the reading means for generating a sentence in the second language translated from the first language.

According to a preferred embodiment of the invention, the apparatus for translating further comprises means responsive to the output from the decomposing means for delivering to the reading and transferring means data of part of speech to which the morpheme of the first language belongs to transfer with the first address.

According to another preferred embodiment of the invention, the decomposing means includes an optical character reader for optically reading a character string of the first language, and for recognizing characters by decomposing the character string into morphemes.

According to another preferred embodiment of the invention, the apparatus for translating further comprises means for recognizing voice and for applying it to the decomposing means.

According to another preferred embodiment of the invention, the reading and transferring means transfer through a flexible lead wire or by wireless means.

According to a further preferred embodiment of the invention, the apparatus for translating further comprises means responsive to an output of the generating means for providing the translated language, the output of the providing means is a visual output, a printed output, an oral output, or a tactile output.

In the device, a character string is optically read by a optical character reader. This character string is compared with the content of a first memory which stores plural character strings, and a meaningful word is recognized. Information relating to the type of word, and address information are transferred to a processing device. The processing device has a second memory which stores certain data including the memory contents of the first memory. The contents of the second memory can be read by specifying the same address as in the first memory. Therefore, at the processing device, each word is translated on the basis of the information relating to the type of word given from the optical character reader and the word obtained from the second memory corresponding to the address information. Thus, the process for extracting a meaningful word from the character string is not duplicated.

According to the invention, as clear from the description herein, in the case of using an optical character reader as the input means to the processing device, the structure of the translation apparatus may be simplified, while the capacity of transfer data from the optical character reader may be reduced, so that the structure relating to the data transfer may be also simplified.

BRIEF DESCRIPTION OF THE DRAWINGS

These and other objects of the invention, as well as the features and advantages thereof, will be better understood and appreciated from the following detailed description taken in conjunction with the drawings, in which:

FIG. 1 and FIG. 2 are flow charts for explaining the procedure of translation processing in the prior art;

FIG. 3 is a block diagram showing a basic composition of an embodiment of the invention;

DETAILED DESCRIPTION OF THE PREFERRED EMBODIMENTS

Figure 4:
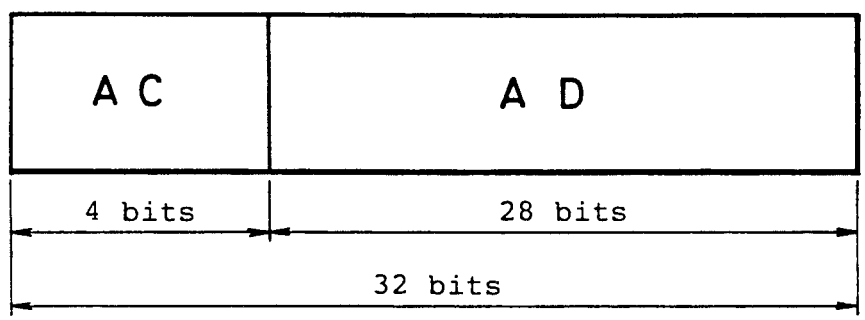
FIG. 4 is a block diagram for explaining the composition of transfer data.

Referring now to the drawings, preferred embodiments of the invention are described in detail below.

FIG. 3 is a block diagram showing the basic composition of an embodiment of the invention. In the structure shown in FIG. 3, translation apparatus 1 which is a processing device and a separate optical character reader (OCR) 2 are connected as input means through a flexible lead wire 19.

In the OCR 2, an original document printed in type in a first language, e.g. English, is read by scanning it with a reading unit 3 including a one-dimensional charge-coupled device (CCD). The corresponding image data is fed into an image buffer 4. The one-dimensional CCD has a receiving plane divided into plural picture element wherein brightness of the reflected light of the light source illuminating the original plane is detected in every picture element. The OCR 2 converts the original image read by the CCD into binary codes of white pixels or black pixels in each picture element depending on the brightness of each picture elements. The obtained image data of the original image is then stored in the image buffer 4.

The image data stored in the image buffer 4 is given to a character segmentation unit 5, which divides the image data into characters. Output from the character segmentation unit 5 is given to a feature extraction unit 6.

At the feature extraction unit 6, from the image data corresponding to a segmented character, the feature data is extracted. The extracted feature data is given to a character recognition unit 7.

A standard character pattern dictionary 8 is connected to the character recognition unit 7. Feature data of a plurality of characters in the first language are stored in the standard character pattern dictionary 8. At the character recognition unit 7, the feature data given from the feature extraction unit 6 and the feature data stored in the standard character pattern dictionary 8 are compared. The feature data of the segmented character is then recognized as corresponding to one of the characters stored preliminarily in the standard character pattern dictionary 8. Thereafter, the character code corresponding to the character recognized in this way is given to a linguistic processing unit 9.

A lexical dictionary 10 is connected to the linguistic processing unit 9. In the lexical dictionary 10, for example, character code strings corresponding to character strings of words of the first language are preliminarily stored in plural sets. At the linguistic processing unit 9, the character code given from the character recognition unit 7 is divided into groups of plural character codes, and the character code strings of each group and the character code strings stored in the lexical dictionary 10 are compared, and one meaningful word or a morpheme is recognized. Additionally, the linguistic processing unit 9 corrects characters estimated to be misrecognized. The address information at the lexical dictionary 10 of the recognized word after such linguistic processing is given to a transfer data converting unit 11.

At the transfer data converting unit 11, on the basis of the address information and the part of speech data from the lexical dictionary 10 as corresponding to the address information, transfer data is generated, and fed into a transfer unit 12. In this way, the read document is morphologically processed in the OCR 2, and the resulting data given to the transfer unit 12.

The lexical dictionary 10 has a memory capacity of 256 Mbytes. With 16 parts of speech to be classified. The data of parts of speech can be expressed in 4-bit data, and the address data of the lexical dictionary 10 can be expressed in a 28-bit data. Therefore, the transfer data generated in the transfer data converting unit 11 possesses the format as shown in FIG. 4 in each word, having a capacity of 32 bits. That is, the transfer data corresponding to each word is composed of 4-bit data of parts of speech AC, and 28-bit data of address AD, and this transfer data is transferred from the transfer unit 12 to a receiving unit 13 of the translation apparatus 1.

Data transfer from the transfer unit 12 to the receiving unit 13 is effected through the lead wire 19 directly connecting the translation apparatus 1 and the OCR 2 shown in this embodiment. In another preferred embodiment, the data transfer may be effected by transmitting and receiving by using electromagnetic waves. Wherein the transfer unit 12 may be provided means for transmitting data to the receiving means in the receiving unit 13.

The data transferred from the OCR 2 received by the receiving unit 13 of the translation apparatus 1 is given to a syntactic analysis unit 14. At the syntactic analysis unit 14, word data of the first language (expressed in character code strings) corresponding to the address data AD of the transfer data is read in from a lexical dictionary 15 from a second memory provided in the translation apparatus 1, and syntactic analysis is processed by referring to the part of speech transfer data AC. The lexical dictionary 15 contains the same memory contents as the lexical dictionary 10 in the OCR 2, and can be read similarly to the lexical dictionary 10 by specifying the same address.

The output of the syntactic analysis unit 14 is given to a semantic analysis unit 16. The semantic analysis unit 16 reads the translated word data in a second language, e.g. Japanese, corresponding to the word data of the first language, e.g. English, from the lexical dictionary 15, and extracts one translated word on the basis of the processing result from the syntactic analysis unit 14. Translated data corresponding to each word extracted in this manner is given to a generation unit 17. At the generation unit 17, a translation is generated in each sentence while accessing the lexical dictionary 15. That is, if the translated word data given from the semantic analysis unit 16 is not matched with the translated sentence including this translated word, different translated word data is read in from the lexical dictionary 15, and the former word is replaced by the most suited translated word to the translated sentence to complete the translated sentence. The output of the generation unit 17 is given to an output unit 18, and delivered as a translated document expressed in as a continuous string of character codes corresponding to each character of the second language.

In this embodiment, as the input means to the translation apparatus 1, the OCR 2 is presented as an example, but it is not limitative. A voice recognition unit or a keyboard may be similarly used, and the character code strings corresponding to the original text to be translated may be fed into the linguistic processing unit 9 of the OCR 2 through the voice uttered by the operator or by manipulation of the keyboard.

At the same time, the translated document delivered from the output unit 18 of the translation apparatus 1 may be presented to the operator by means of a visual display using a cathode-ray tube (CRT) or a liquid crystal display (LCD). In another preferred embodiment, the output of the output unit is printed as a translated document. In a further preferred embodiment, the output is an oral output or a tactile output.

Figure 5:
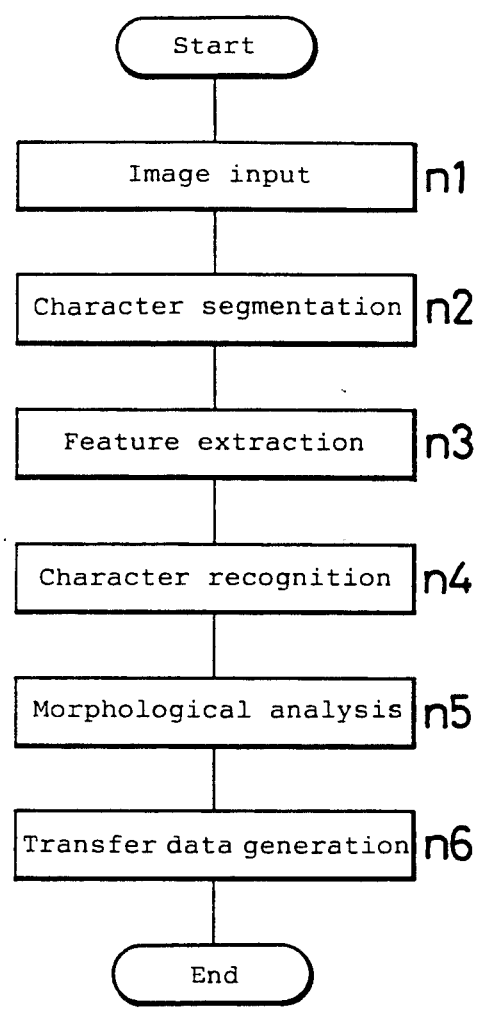
FIG. 5 is a flow chart for explaining the operation of an OCR 2.
Figure 6:
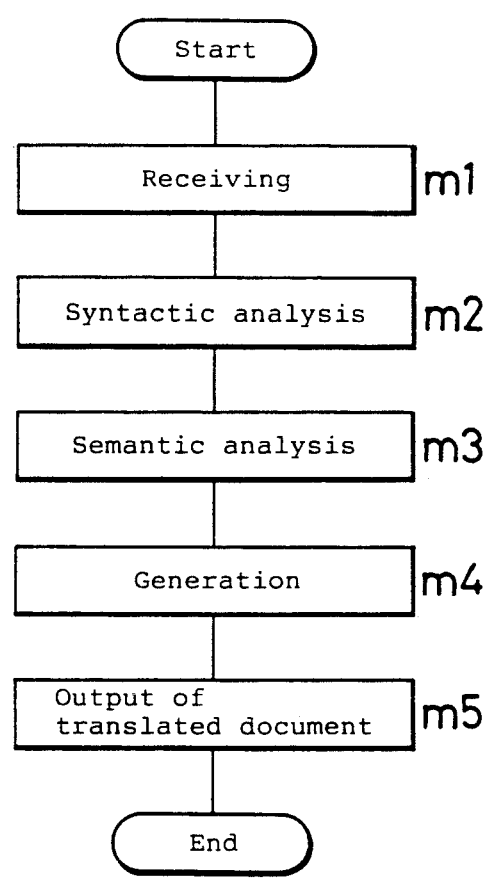
FIG. 6 is a flow chart for explaining the operation of a translation apparatus 1.

FIG. 5 is a flow chart for explaining the character recognition processing in the OCR 2, and FIG. 6 is a flow chart for explaining the translation processing in the translation apparatus 1. In FIG. 5, the image data being read by the reading unit 3 is stored as image data in the image buffer 4 at step n1.

At step n2, the stored image data is extracted corresponding to each character of the document in the character segmentation unit 5, and is given to the feature extraction unit 6.

At step n3, the feature is extracted, and at step n4 the character recognition unit 7 compares the feature data being extracted and the feature data corresponding to plural characters stored in the character standard pattern dictionary 8, and recognizes the segmented character, and gives this character code to the linguistic processing unit 9.

At step n5, the linguistic processing unit 9 compares each group of plural character codes with plural character code strings corresponding to the character strings of meaningful words stored in the lexical dictionary 10, and determines the morpheme expressed in each group as the morphological analysis processing. By such morphological analysis processing, misrecognition of characters in the character recognition unit 7 is corrected.

At step n6, transfer data is generated from the address data in the lexical dictionary 10 corresponding to the word obtained by linguistic processing including the above morphological analysis processing, and the part of speech of the word.

In FIG. 6, the transfer data generated in this way and transferred from the OCR 2 is received by the receiving unit 13 of the translation apparatus 1 at step m1. On the basis of the received data, at step m2, the syntactic analysis unit 14 reads out the word data corresponding to the address data AD from the lexical dictionary 15, and refers to the part of speech data AC, and analyzes the modifying/modified relation as the syntactic analysis processing.

At step m3, the semantic analysis unit 16 reads in the most suitable translated word data from the plural translated word data corresponding to the word, from the lexical dictionary 15, on the basis of the syntactic analysis processing. Such translated word data is, at step m4, given to the generation unit 17, and the most suited translated word to the translated sentence is selected, and the translated sentence is generated. That is, in every translated sentence, an unmatched translated word is replaced with other translated word stored in the lexical dictionary 15.

At step m5, on the basis of the output of the generation unit 17, a translated document is delivered as a continuous string of character codes for each respective character.

Thus, in this embodiment, from the OCR 2 to the translation apparatus 1, the part of speech data expressing the type of word, and the address data of the recognized word commonly specified in the lexical dictionaries 10, 15 are transferred. Accordingly, the translation apparatus 1 can process the translation without repeating the morphological analysis processing once carried out by the OCR 2. As a result, duplication of morphological analysis processing by the OCR 1 and translation apparatus 1 as mentioned in the description of prior art is prevented, and at the same time the quantity of data transferred from the OCR 2 to the translation apparatus 1 may be reduced. In other words, in the transfer of character data by document file, the document is transferred as a continuous string of character codes of about 6 bytes in average in each word, whereas in this embodiment, data of only 4 bytes (32 bits) is transferred for each word. Therefore, the interface between the OCR 2 and translation apparatus 1 may be simplified.

In the foregoing embodiment, 4-byte data is transferred for every word from the OCR 2 to the translation apparatus 1, but this data capacity may be arbitrarily determined depending on the memory capacity of lexical dictionaries 10, 15, or the kind of language to be translated.

Furthermore, in the embodiment, the morphological analysis processing is done in the OCR 2, but the structure of the translation apparatus may be further simplified. Feeding data to the translation apparatus by adding the processing data when performing other processing necessary for translation processing (for example, syntactic analysis processing, etc.) enhances the recognition rate of the language to be translated. In this case, the data to be transferred may include, for example, the part of speech data address information, and syntactic analysis processing information.

For example, when only morphological analysis processing is done in the OCR 2, in the event of misrecognition of "I can ... " for "1 can ... ," it cannot be corrected, but when syntactic analysis processing is also done in the OCR 2, such error can be also corrected, and the recognition rate of the OCR 2 is enhanced. In such a case, by feeding the data including the syntactic analysis processing information into the translation apparatus 1, it is not necessary to perform the processing before the syntactic analysis processing at the translation apparatus 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for electronically translating from a first language to a second language, the steps comprising:
   optically reading a character string of a first language by an optical character reader;
   preparing a reference dictionary for morpheme analysis containing a plurality of reference character strings of morphemes from the first language and stored in a first memory means wherein each morpheme being identified in said first memory means by a particular address;
   conducting a morpheme analysis using said optical code reader by comparing a portion of said optically read character string with said plurality of reference character strings for identifying morphemes corresponding to said portion and the associated addresses;
   electronically communicating the results of said morpheme analysis including any morphemes, and their associated addresses to a remote translating device;
   receiving said communicated morpheme analysis and associated addresses by said remote translating device; and
   translating said optically read character string into said second language by comparing said transferred morpheme analysis and associated addresses with information stored in a second memory means, wherein information stored in said second memory means is addressed identically to that of said first memory means.

2. An apparatus for electronically translating from a first language to a second language, comprising:
   optical code reader for reading a character string of a first language, said reader having,
   reference dictionary means for morpheme analysis containing a plurality of reference character strings of morphemes in said first language stored in a first memory means, wherein each morpheme being identified in said first memory means by a particular address;
   morpheme analysis means for comparing a portion of said optically read character string with said plurality of reference character strings for identifying morphemes corresponding to said character string and their associated addresses;

electronic communication means for transferring the results of said morpheme analysis including any morphemes and their associated addresses in said first memory means; and translating means for receiving said morpheme analysis from said optical code reader and for translating said character string into said second language by comparing said transferred morpheme analysis and associated addresses with information stored in a second memory means, wherein information stored in said second memory means is addressed identically to that of said first memory means.

* * * * *